United States Patent [19]

Campbell

[11] Patent Number: 5,078,270
[45] Date of Patent: Jan. 7, 1992

[54] COMPACT DISC STORAGE CONTAINER MATRIX

[76] Inventor: Bernard C. Campbell, 526 Madison St., Oshkosh, Wis. 54901

[21] Appl. No.: 559,673

[22] Filed: Jul. 23, 1990

[51] Int. Cl.5 .............................................. B65D 85/30
[52] U.S. Cl. ..................... 206/444; 206/504; 206/509; 206/806; 220/23.4; 220/23.83; 211/41; 211/194
[58] Field of Search ............... 206/387, 444, 504, 509, 206/510, 806; 220/23.2, 23.4, 23.83, 23.86; 211/41, 194

[56] References Cited

U.S. PATENT DOCUMENTS

| | | | |
|---|---|---|---|
| 3,599,828 | 8/1971 | Conway | 220/23.4 |
| 3,635,350 | 1/1972 | Wolf | 206/387 |
| 3,851,936 | 12/1974 | Muller | 220/23.4 |
| 3,909,088 | 9/1975 | Dennehey et al. | 211/41 |
| 4,098,402 | 7/1978 | Rogg | 206/387 |
| 4,192,562 | 3/1980 | Bishoff et al. | 220/23.4 |
| 4,397,389 | 8/1983 | Findeisen | 206/387 |
| 4,431,237 | 2/1984 | Saito et al. | 206/387 |
| 4,519,655 | 5/1985 | Kamperman | 206/387 |
| 4,708,239 | 11/1987 | Bourbon | 206/387 |
| 4,951,826 | 8/1990 | Tompkins | 211/41 |

*Primary Examiner*—David T. Fidei
*Attorney, Agent, or Firm*—Leon Gilden

[57] ABSTRACT

Apparatus defining a matrix of compact disc containers wherein an I-shaped support beam mounts a rectangular matrix of the containers wherein each container defines a cavity therewithin with a retainer flange securing a compact disc positioned within a transparent sleeve within each container. A cover flap prevents environmental contamination of dust and debris from entering each sleeve.

4 Claims, 5 Drawing Sheets

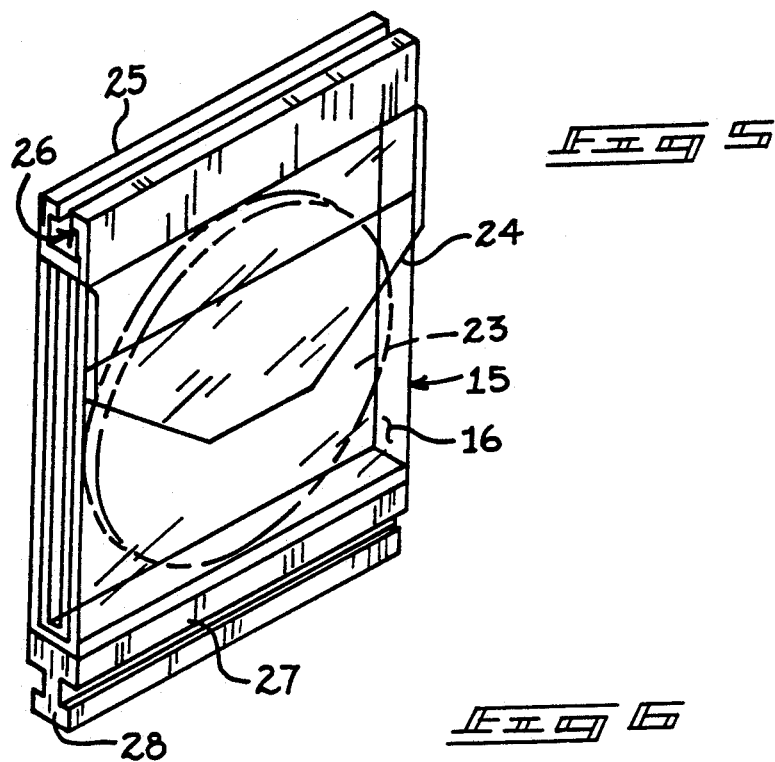
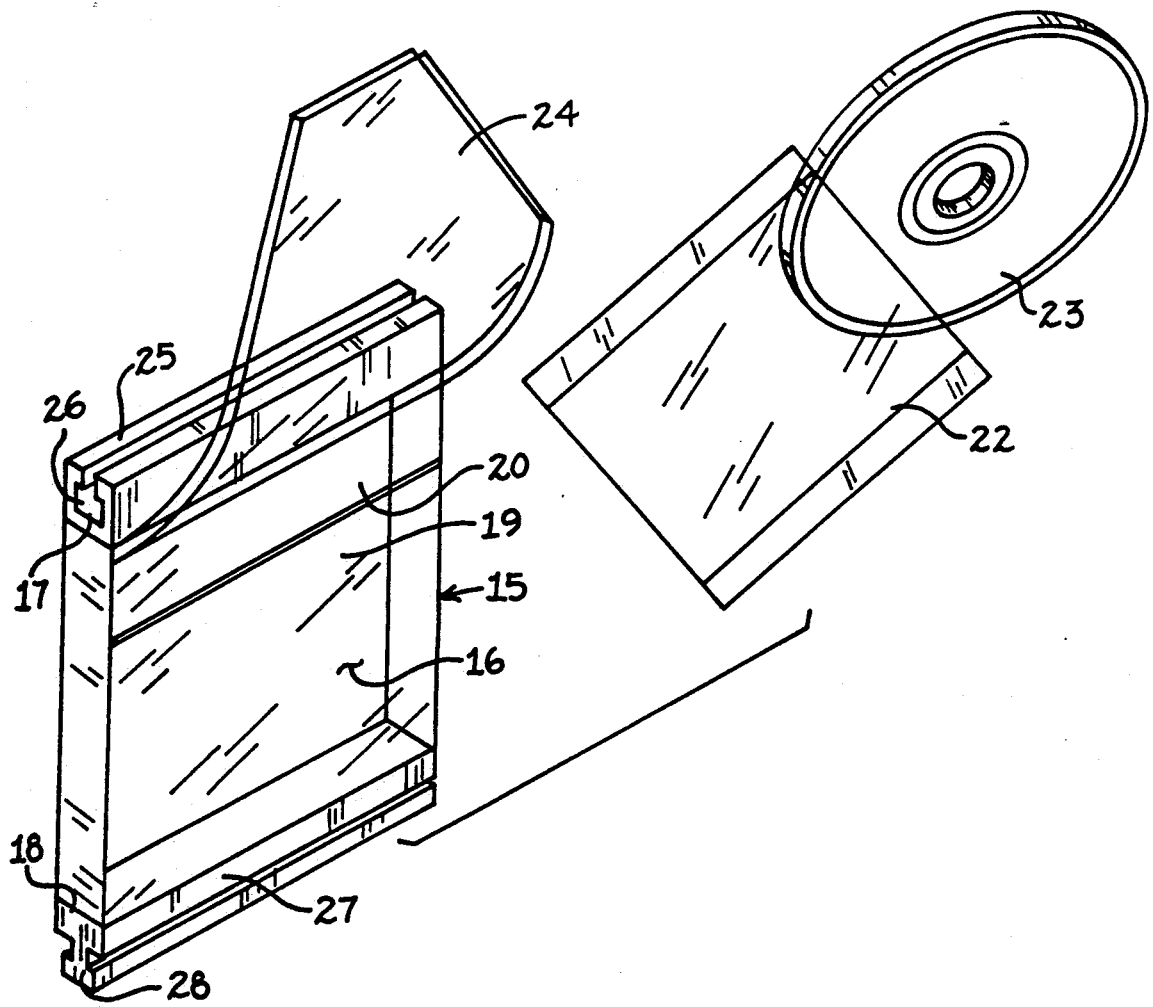

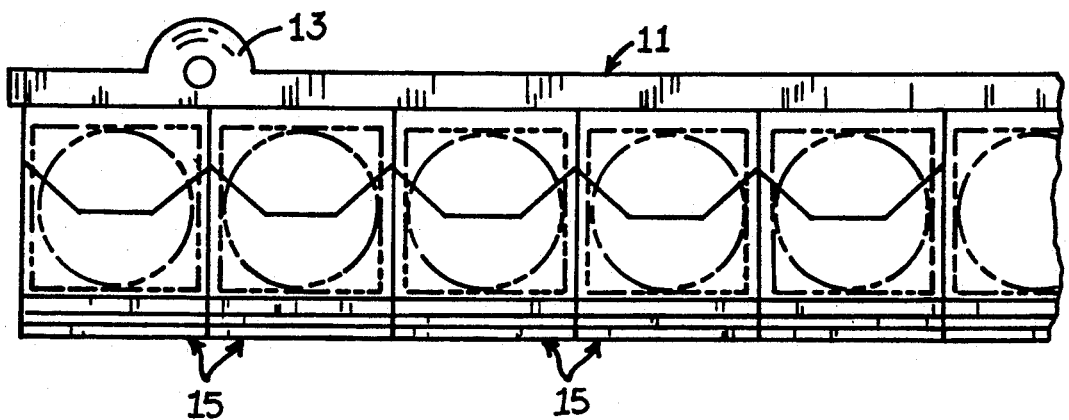
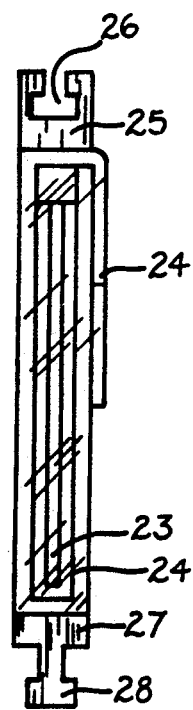

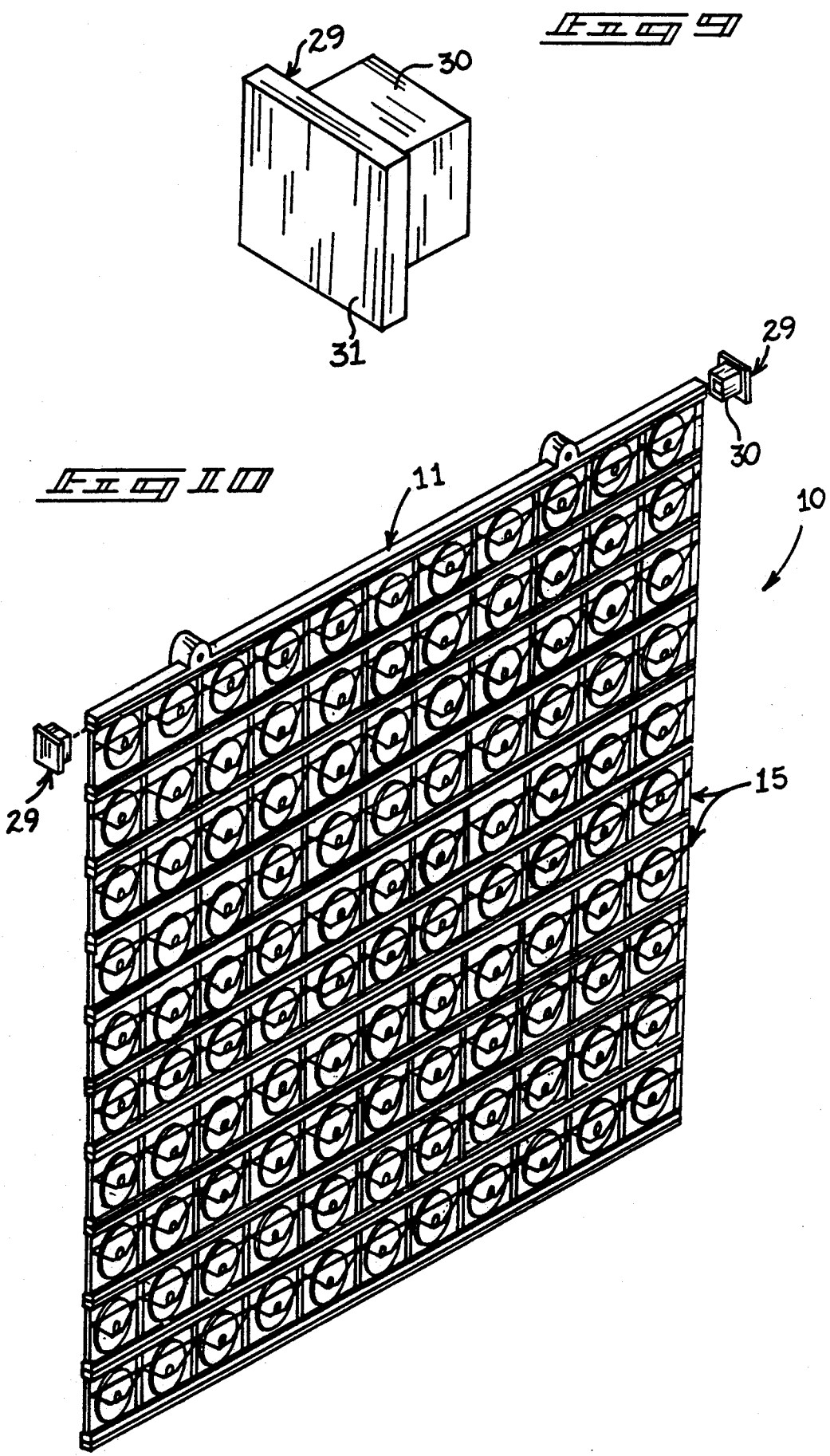

COMPACT DISC STORAGE CONTAINER MATRIX

BACKGROUND OF THE INVENTION

1. Field of the invention

The field of the invention relates to compact disc storage apparatus, and more particularly pertains to a new and improved compact disc storage container matrix wherein the same permits selective interlocking of adjacent compact disc storage containers to define a curtain of such containers for ease of storage and use.

2. Description of the Prior Art

Storage container apparatus for mounting container discs has been provided in the prior art wherein typically such organizations are of a generally fixed construction and of a relatively rigid organization to require a relatively fixed physical displacement of a horizontal support surface. The instant invention attempts to overcome deficiencies of the prior art by providing an organization that may be suspended to define a generally vertically oriented curtain of containers to effect storage therewithin of a selective number of compact disc storage containers. Prior art organizations may be found in U.S. Pat. No. 4,850,477 to GELARDI et al wherein a compact disc storage organization includes a container with a divider member positioned within the container wherein the divider container includes aligned pairs of ribs for securing compact disc members within opposed pairs of ribs.

U.S. Pat. No. 4,708,239 to BOURBON sets forth a compact disc storage and display box wherein a generally rectangular box structure includes a support leg arranged at an obtuse angle thereto for display and securement of a compact disc within the container.

U.S. Pat. No. 4,566,590 to MANNING et al sets forth a compact disc storage member including a pouch that selectively permits further securement of a tape cassette as well as a compact disc.

U.S. Pat. No. 4,850,485 to ISHIKAWA sets forth a cartridge magazine wherein spaced parallel leg members are arranged in a vertical orientation include parallel ribs to secure tape decks therebetween.

U.S. Pat. No. 4,712,679 to LOWE provides a container including parallel rib structures formed about a bottom floor of the container permits securement of various compact disc plates therewithin.

As such, it may be appreciated that there continues to be a need for a new and improved compact disc storage container matrix as set forth by the instant invention which provides selective development of a compact disc storage matrix as required to develope a container organization of desired dimensions for storage of compact discs therewithin and in this respect, the present invention substantially fulfills this need.

SUMMARY OF THE INVENTION

In view of the foregoing disadvantages inherent in the known types of compact disc storage apparatus present in the prior art, the present invention provides a new and improved compact disc storage container matrix wherein the same permits selective physical development of a compact disc storage organization of desired dimensional configuration to secure a selective quantity of compact disc elements. As such, the general purpose of the present invention, which will be described subsequently in greater detail, is to provide a new and improved compact disc storage container matrix which has all the advantages of the prior art compact disc storage container apparatus and none of the disadvantages.

To attain this, the compact disc storage container matrix organization of the instant invention essentially comprises apparatus defining a matrix of compact disc containers wherein an I-shaped support beam mounts a rectangular matrix of the containers wherein each container defines a cavity therewithin with a retainer flange securing a compact disc positioned within a transparent sleeve within each container. A cover flap prevents environmental contamination of dust and debris from entering each sleeve.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved compact disc storage container matrix which has all the advantages of the prior art compact disc storage container apparatus and none of the disadvantages.

It is another object of the present invention to provide a new and improved compact disc storage container matrix which may be easily and efficiently manufactured and marketed.

It is a further object of the present invention to provide a new and improved compact disc storage container matrix which is of a durable and reliable construction.

An even further object of the present invention is to provide a new and improved compact disc storage container matrix which is susceptible of a low cost of manufacture with regard to both materials and labor, and which accordingly is then susceptible of low prices of sale to the consuming public, thereby making such compact disc storage container matrix economically available to the buying public.

Still yet another object of the present invention is to provide a new and improved compact disc storage container matrix which provides in the apparatuses and methods of the prior art some of the advantages thereof, while simultaneously overcoming some of the disadvantages normally associated therewith.

Still another object of the present invention is to provide a new and improved compact disc storage container matrix which may be compactly stored when not being utilized.

Yet another object of the present invention is to provide a new and improved compact disc storage container matrix wherein the same permits secure and protected housing of a compact disc within a selective container and further provides development of a matrix of compact disc housing members as required by an individual.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of a compact disc container as utilized by the instant invention.

FIG. 6 is an isometric illustration somewhat exploded of the compact disc container as illustrated in FIG. 5.

FIG. 7 is an orthographic frontal view taken in elevation of the matrix of the instant invention in a partially assembled configuration.

FIG. 8 is an orthographic side view taken in elevation of a compact disc container as utilized by the instant invention.

FIG. 9 is an isometric illustration of an end cap utilized by the support beam structure of the instant invention.

FIG. 10 is a isometric illustration of the container matrix of the instant invention in an assembled configuration.

DESCRIPTION OF THE PREFERRED EMBODIMENT

Figure 1:
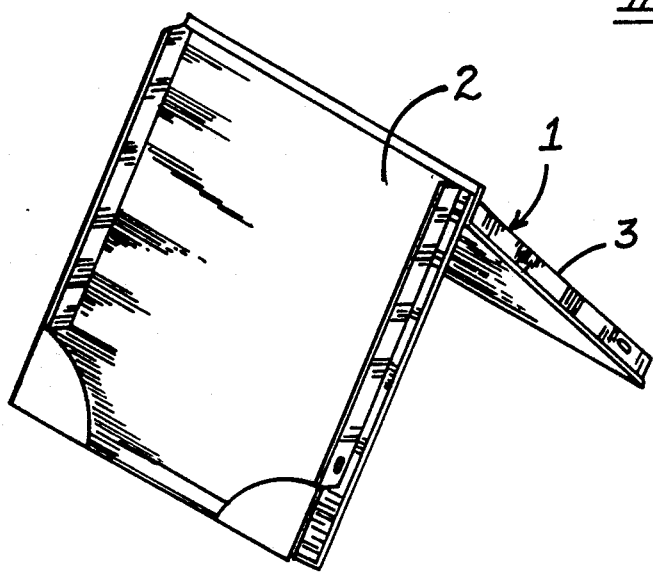
FIG. 1 is an isometric illustration of a prior art compact disc storage container apparatus.

With reference now to the drawings, and in particular to FIGS. 1 to 10 thereof, a new and improved compact disc storage container matrix embodying the principles and concept of the present invention and generally designated by the reference numeral 10 will be described.

Figure 2:
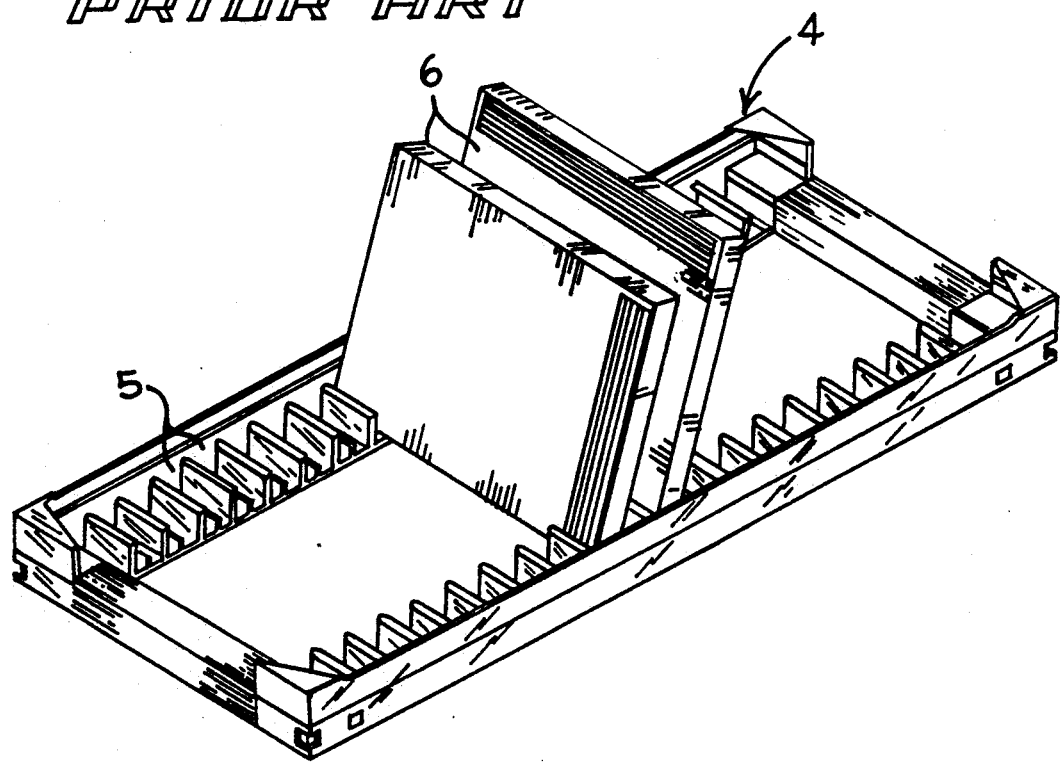
FIG. 2 is an isometric illustration of a further compact disc storage container apparatus.
Figure 3:
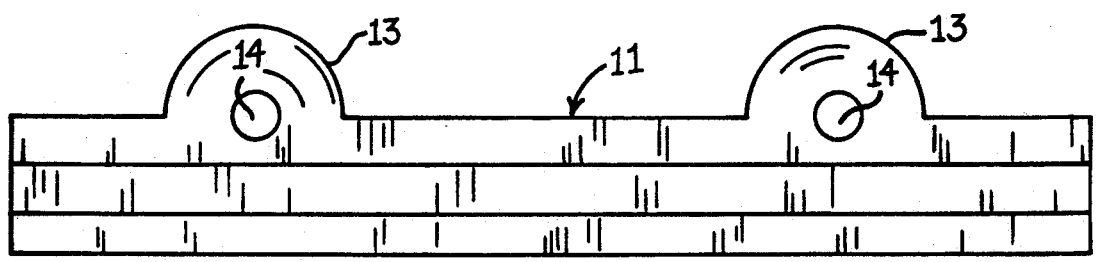
FIG. 3 is an orthographic frontal view taken in elevation of a support beam utilized by the apparatus.
Figure 4:
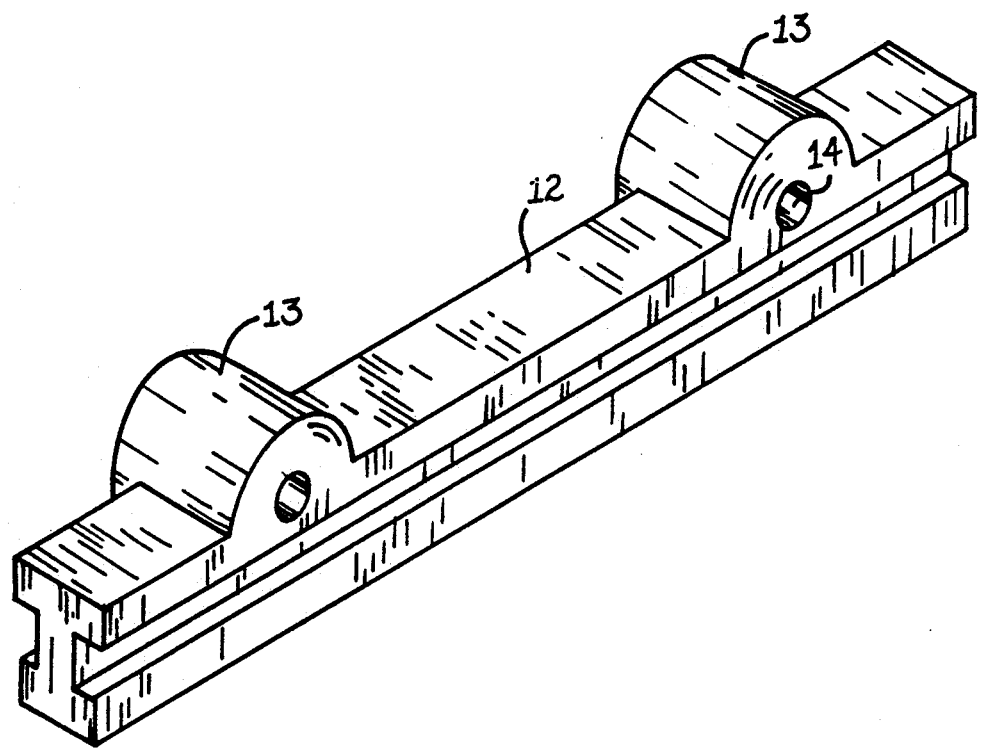
FIG. 4 is an isometric illustration of the support beam as illustrated in FIG. 3.

FIG. 1 illustrates a prior art compact disc storage and display member 1 defining a container 2 and a support plate 3 to maintain the container at a predetermined orientation relative to a support surface. FIG. 2 illustrates a prior art compact disc container member 4 wherein spaced parallel slots 5 are defined by a spaced parallel ribs for securement of compact disc container 6 therewithin.

More specifically, the compact disc storage container matrix of the instant invention essentially comprises an organization as illustrated essentially in FIG. 10 including an elongate longitudinally aligned I-shaped support beam 11. The support beam 11 includes a top surface 12 with a pair of spaced boss members 13 integrally mounted to the top surface 12 with a boss member bore 14 orthogonally directed through each boss member 13 orthogonally arranged relative to a longitudinal axis defined by the support beam 11. The compact disc storage container matrix includes a series of inter-connectable parallelepiped containers 15 each including a generally parallelepiped container cavity 16. The container 15 is defined by a top end wall 17 parallel to and spaced from a bottom end wall 18. A vertical floor wall 19 defined by a first height is coextensively formed and directed between the top and bottom end wall 17 and 18 respectively. A retainer flange 20 is spaced parallel to the floor wall 19 and extends downwardly from the top end wall 17 a second height less than that defined by the first height to permit insertion of a respective transparent flexible sleeve 22 housing an audio compact disc 23 within each container 15. A cover flap mounted overlying the retainer flange 20 with an upper edge coextensively an fixedly secured to the top end wall 17 is lifted to permit insertion of the compact disc 23 and associated sleeve 22 within the container cavity 16. The cover flap 24 is formed of a flexible generally polymeric material defined by a third height less than the first height of the vertical floor wall 19 and greater than the second height of the retainer flange 20 to retain and protect the sleeve 22 and its contents within the cavity 16 from contamination by airborne particles and the like. A top securement boss 25 is coextensively and integrally formed to the top end wall 17 and includes a T-shaped slot 26 formed coextensively therealong for selective securement to an overlying container 15 or to be slidably received within the I-shaped support beam 11 in a manner as illustrated in FIG. 7 or FIG. 10. A bottom securement mounting boss 27 is coextensively and integrally formed to the bottom end wall 18 and includes a T-shaped flange 28 to receive an underlying T-shaped slot 26 of an underlying container. Upon securement of a predetermined number of containers 15 within the support beam 11, an end cap 29 defining an end cap socket 30 is mounted to fixedly secure each terminal end of the support beam 11 within each socket wherein an end cap plate 31 extends beyond a predetermined cross-sectional configuration of the support beam 11 to prevent inadvertent removal and loss of a container 15 from a mounting to an I-shaped support beam 11. It should be understood that each T-shaped slot complementarily receives the I-shaped support beam 11 or an overlying T-shaped flange 28. The matrix of containers 15 when assembled are arranged in a single plane to define a curtain of containers 15 for ease of storage and mounting relative to the support beam 11.

As to the manner of usage and operation of the instant invention, the same should be understood from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A compact disc storage container matrix comprising in combination,
    an elongate support beam, the support beam including a top surface with a plurality of spaced boss members mounted to the top surface of each boss member including a boss member bore directed orthogonally through each boss member to permit mounting of the support beam, and
    a plurality of parallel and vertically arranged rows and columns of containers mounted to the support beam to define a rectangular matrix of containers selectively securable to the support beam, and
    wherein the support beam is defined by an elongate longitudinally aligned "I" shaped support beam, and the matrix of containers includes a top row of containers mounted to the support beam, wherein each container of the top row of containers defines a vertical column of containers, and
    wherein each container is defined as a parallelpiped configuration and further includes a parallelpiped container cavity therewithin, and
    wherein each container further defines a top end wall spaced from and parallel to a bottom end wall, the top end wall including an elongate "T" shaped slot coextensively and integrally formed to the top end wall, and the bottom end wall including an elongate coextensively formed "T" shaped flange, wherein the "T" shaped slot of the "T" shaped flange are arranged parallel relative to one another, and
    wherein the container further is defined by a vertical floor wall coextensively mounted to the top and bottom end walls and defined by a first height, and including a retainer flange, the retainer flange is coextensively mounted to and extends downwardly from the top end wall and is spaced from and parallel to the floor wall as defined by a second height less than the first height.

2. A storage container matrix as set forth in claim 1 wherein a storage container matrix further includes a transparent flexible sleeve, the transparent flexible sleeve arranged for complementarily receiving an audio compact disc element therewithin wherein the flexible sleeve is complementarily receivable within the container cavity.

3. A storage container matrix as set forth in claim 2 wherein the container further includes a flexible cover flap, the cover flap including a top edge coextensively and fixedly mounted to the top end wall overlying the retainer flange wherein the cover flap is defined by a third height less than the first height and greater than the second height.

4. A storage container matrix as set forth in claim 3 wherein the support beam includes a right and left terminal end, and an end cap securable to each terminal end, each end cap includes an end cap socket to complementarily receive a respective terminal end of the support beam therewithin, and the socket includes an end cap plate fixedly mounted to the socket to extend laterally beyond each terminal end of the support beam to provide an abutment preventing inadvertent displacement of a container from the support beam.

* * * * *